(12) United States Patent
Stingle et al.

(10) Patent No.: US 9,493,093 B2
(45) Date of Patent: Nov. 15, 2016

(54) VARIABLE POSITION SEAT MOUNTING SYSTEM

(71) Applicant: OshKosh Corporation, Oshkosh, WI (US)

(72) Inventors: Chad Stingle, Neenah, WI (US); Jeremy Andringa, Hortonville, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 14/559,533

(22) Filed: Dec. 3, 2014

(65) Prior Publication Data

US 2015/0151651 A1    Jun. 4, 2015

Related U.S. Application Data

(60) Provisional application No. 61/911,910, filed on Dec. 4, 2013.

(51) Int. Cl.
| | |
|---|---|
| *B60N 2/06* | (2006.01) |
| *B60R 22/20* | (2006.01) |
| *B60N 2/07* | (2006.01) |

(52) U.S. Cl.
CPC ............. *B60N 2/062* (2013.01); *B60N 2/0732* (2013.01)

(58) Field of Classification Search
CPC ...... B60N 2/062; B60N 2/0735; B60N 2/24; B60N 2/06; B60N 2/067; B60N 2/245; B60N 2/4235; B60N 2/42736; B60N 2/4279; B03C 11/00; B03C 2201/02; B62D 21/157; B62D 21/152; B62D 25/10; B62D 33/0625; B62D 33/0633; B62D 49/085; B62D 9/02

USPC ........ 248/425; 296/65.13, 63, 64, 65.01, 66, 296/68.1, 65.02, 65.14, 65.15, 19, 37.8, 296/37.15, 65.11

See application file for complete search history.

(56) References Cited

U.S. PATENT DOCUMENTS

| | | | |
|---|---|---|---|
| 2,587,679 A | 3/1952 | Atkinson | |
| 2,758,872 A | 8/1956 | Solomon et al. | |
| 3,922,029 A * | 11/1975 | Urai ..................... | B60N 2/4214 248/429 |
| 4,396,220 A | 8/1983 | Dieckmann et al. | |
| 5,632,521 A * | 5/1997 | Archambault ........... | A61G 3/00 296/65.13 |
| 6,460,922 B1 * | 10/2002 | Demick ............... | B60N 2/3034 296/65.11 |
| 7,195,302 B2 * | 3/2007 | Jovicevic ............. | B60N 2/2809 296/65.01 |
| 7,621,580 B2 * | 11/2009 | Randjelovic ......... | B60N 2/0735 296/65.13 |
| 8,191,485 B1 * | 6/2012 | Whalen .................. | F16M 11/00 108/42 |
| 8,770,659 B2 * | 7/2014 | Isherwood ......... | B64D 11/0691 297/14 |
| 2009/0255058 A1 * | 10/2009 | Chinn .................... | A47C 17/80 5/118 |

* cited by examiner

*Primary Examiner* — Glenn Dayoan
*Assistant Examiner* — Sunsurraye Westbrook
(74) *Attorney, Agent, or Firm* — Foley & Lardner LLP

(57) ABSTRACT

A vehicle includes a chassis defining a longitudinal axis, a cab coupled to the chassis and including a cab wall extending laterally across the longitudinal axis, a rail disposed along the cab wall, and a seat bracket coupling a seat to the rail. The rail includes a plurality of discrete interface points that define a first mounting location and a second mounting location. The seat bracket and the seat are selectively repositionable along the rail into the first mounting location or the second mounting location.

11 Claims, 21 Drawing Sheets

VARIABLE POSITION SEAT MOUNTING SYSTEM

CROSS-REFERENCE TO RELATED PATENT APPLICATIONS

This application claims the benefit of U.S. Provisional Patent Application No. 61/911,910, filed Dec. 4, 2013, which is incorporated herein by reference in its entirety.

BACKGROUND

Emergency vehicles (e.g., ambulances, fire apparatuses, etc.) are designed according to various customer requirements. By way of example, a municipality may require that a fire apparatus have seating for three passengers or that the cab include provisions for the storage of certain equipment. By way of another example, a municipality may require that a fire apparatus include seats positioned in a particular arrangement. Seats are traditionally mounted in specific locations within the cab, according to the customer's requirements, and secured with brackets welded to the cab structure. Altering the position of the seat requires a partial remanufacture of the cab assembly (e.g., removing existing brackets and welding in new brackets, etc.). Such remanufacture is expensive and is often completed by the original equipment manufacturer. The original equipment manufacturer may also need to conduct additional testing to verify that the modified fire apparatus satisfies various governing standards, such as those set forth by the National Fire Protection Association. Despite this deficiency, emergency vehicles often include non-adjustable seats mounted with brackets fixed to a rear wall of the cab.

SUMMARY

One exemplary embodiment relates to a vehicle. The vehicle includes a chassis having a longitudinal axis, a cab coupled to the chassis and including a cab wall extending laterally across the longitudinal axis, a rail disposed along the cab wall, and a seat bracket coupling a seat to the rail. The rail includes a plurality of discrete interface points that define a first mounting location and a second mounting location. The seat bracket and the seat are selectively repositionable along the rail into the first mounting location or the second mounting location.

Another exemplary embodiment relates to a vehicle. The vehicle includes a chassis having a longitudinal axis, a cab coupled to the chassis and including a cab wall extending laterally across the longitudinal axis, and a lower rail and an upper rail disposed along the cab wall. The lower rail and the upper rail each include a plurality of discrete interface points defining a plurality of mounting locations. A seat bracket couples a seat to the lower rail. The vehicle further includes a restraint system including a lower seatbelt anchor coupled to the lower rail in one of the plurality of mounting locations and an upper seatbelt anchor coupled to the upper rail in one of the plurality of mounting locations. The restraint system is selectively repositionable along the upper rail and the lower rail into any of the plurality of mounting locations such that the seat position may be varied across the cab wall.

Another exemplary embodiment relates to a method of manufacturing a vehicle. The method includes providing a chassis having a longitudinal axis, providing a cab including a cab wall that extends laterally across the longitudinal axis, positioning a rail along the cab wall, and providing a seat bracket configured to couple a seat to the rail. The rail includes a plurality of discrete interface points that define a first mounting location and a second mounting location. The seat bracket and the seat are selectively repositionable along the rail into the first mounting location or the second mounting location.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
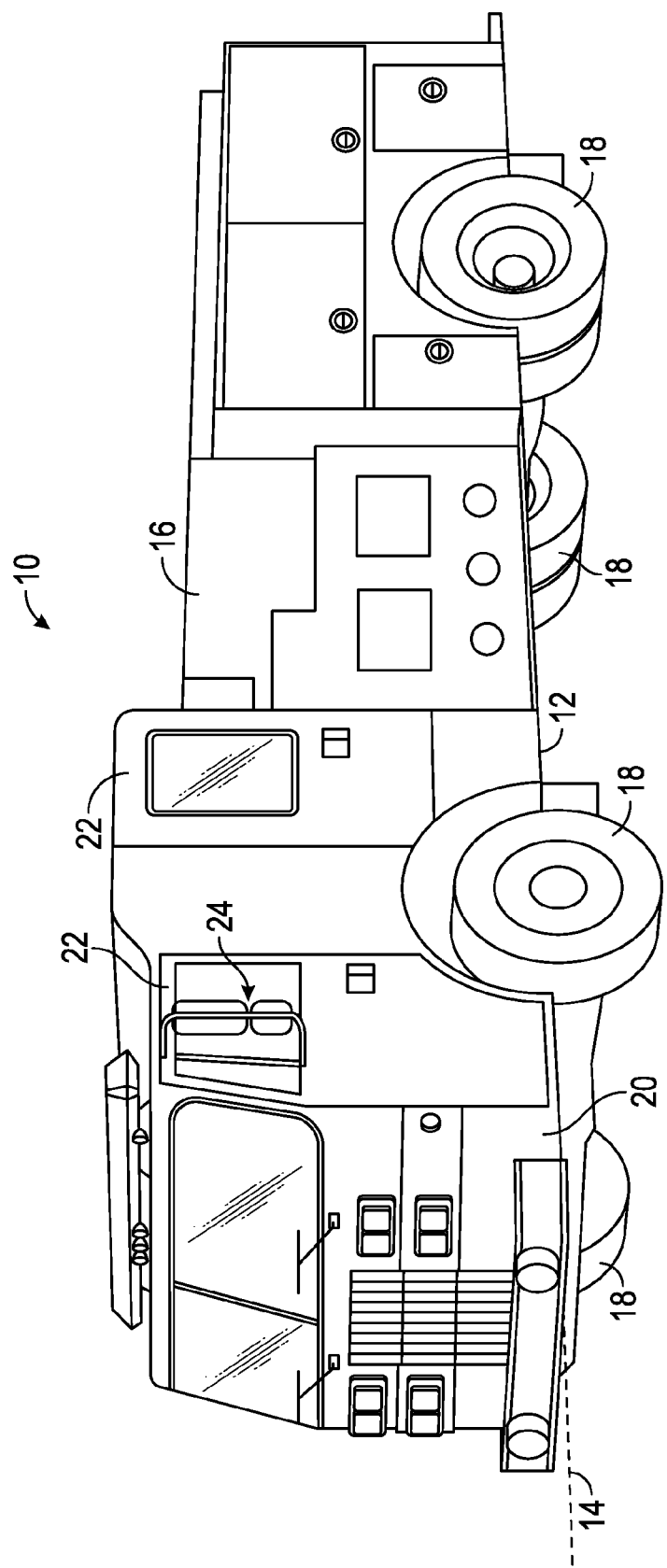
FIG. 1 is a front perspective view of a fire truck, according to an exemplary embodiment.

According to the exemplary embodiment shown in FIG. 1, a vehicle, shown as a fire truck 10, includes a chassis, shown as a frame 12, defining a longitudinal axis 14. The frame 12 supports a body assembly, shown as a rear section 16, a number of wheels with tires 18, and a cab, shown as front cabin 20. The longitudinal axis 14 is generally aligned with a frame rail of the fire truck 10 (e.g., front to back). As shown in FIG. 1, the fire truck 10 is a pumper truck. According to alternative embodiments, the fire truck 10 is an aerial truck, a rescue truck, a commercial truck, a tanker, or still another fire apparatus. According to the exemplary embodiment shown in FIG. 1, the fire truck 10 is a municipal fire truck. According to alternative embodiments, the fire truck 10 may be an airport rescue and firefighting (ARFF) vehicle, a forest fire apparatus, or still another type of firefighting vehicle. According to still other embodiments, the vehicle may be another type of vehicle (e.g., an ambulance, a military vehicle, a concrete mixing vehicle, an access vehicle, a commercial vehicle, etc.).

Referring still to the exemplary embodiment shown in FIG. 1, the front cabin 20 is positioned forward of the rear section 16 (e.g., with respect to a forward direction of travel for the vehicle and the longitudinal axis 14). According to an alternative embodiment, the cab assembly may be positioned behind the rear section 16 (e.g., with respect to a forward direction of travel for the vehicle). The cab assembly may be positioned behind the rear section 16 on, by way of example, a rear tiller fire truck.

According to an exemplary embodiment, the front cabin 20 includes a plurality of body panels coupled to a support (e.g., a structural frame assembly). The body panels may define a plurality of openings through which an operator accesses (e.g., for ingress, for egress, to retrieve components from within, etc.) an interior 24 of front cabin 20. As shown in FIG. 1, front cabin 20 includes a pair of doors 22 positioned over the plurality of openings defined by the plurality of body panels. A first door 22 may be coupled to front cabin 20 forward of wheel and tire 18. The first door 22 may provide access to the interior 24 of front cabin 20 for a driver of fire truck 10 or a captain of the firefighting company. A second door 22 may be coupled to front cabin 20 behind wheel and tire 18. The second door 22 may provide access to the interior 24 of front cabin 20 for other firefighters.

Figure 2:
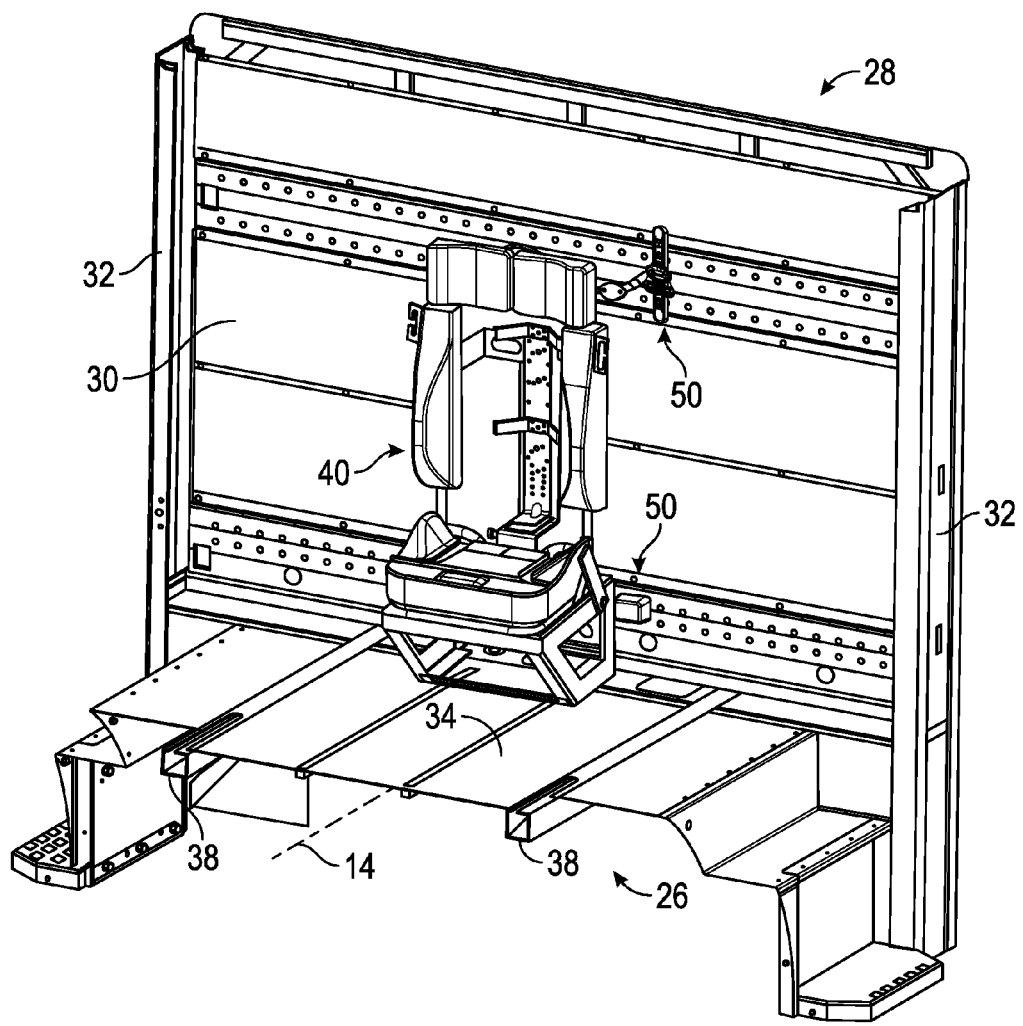
FIG. 2 is a front perspective view of a variable position seat mounting system, according to an exemplary embodiment.

Referring next to the exemplary embodiment shown in FIGS. 2-10, the structural frame assembly of the front cabin 20 includes, among other components, a floor 26 and a cab wall, shown as cab wall 28, extending in a generally vertical direction. As shown in FIG. 2, the cab wall 28 is orthogonal to the longitudinal axis 14. The cab wall 28 is a structural member providing a body to which seating and other components may be mounted. As shown in FIG. 2, the cab wall 28 is a full height wall extending from the floor 26 to a ceiling of the front cabin 20. In other embodiments, the cab wall 28 is a partial wall extending only a portion of the distance between the floor 26 and the ceiling of the front cabin 20. In the exemplary embodiment shown in FIG. 2, the cab wall 28 is a rear wall defining the rear portion of the front cabin 20. In other embodiments, the cab wall 28 is another wall extending laterally across the longitudinal axis 14. By way of example, the cab wall 28 may be an intermediate wall dividing the front cabin 20 into a front portion and a back portion.

The cab wall 28 is constructed in a manner that provides strength and rigidity to support the front cabin 20. According to an exemplary embodiment, the cab wall 28 includes panels 30 that are coupled (e.g., welded, coupled with mechanical fasteners, etc.) to frame members, shown as frame members 32. The cab wall 28 may further include additional members (e.g., bars, tubes, gusset plates, sub-weldments, etc.) to provide additional strength and rigidity to the cab wall 28 or to localized portions of the cab wall 28. In other embodiments, the cab wall 28 is an open framework or formed of a solid plate.

The floor 26 is constructed in a manner that provides strength and rigidity to support the front cabin 20 and occupants standing or sitting within the interior of the front cabin 20. According to an exemplary embodiment, the floor 26 includes panels 34 that are coupled (e.g., welded, coupled with mechanical fasteners, etc.) to frame members 38. The floor 26 may further include additional members (e.g., bars, tubes, gusset plates, sub-weldments, etc.) to provide additional strength and rigidity to the floor 26 or to localized portions of the floor 26. In other embodiments, the floor 26 is formed of a solid plate.

The front cabin 20 may include components arranged in various configurations. Such configurations may vary based on the particular application of the fire truck 10, customer requirements, or still other factors. The front cabin 20 may be configured to contain or otherwise support at least one of a number of occupants, storage units, and equipment. The front cabin 20 is configured to provide seating for at least one occupant with a seat, shown as seat 40. The front cabin 20 may include one or more storage areas for providing compartmental storage for various articles (e.g., supplies, instrumentation, equipment, etc.). In various configurations, the front cabin 20 may provide seating for a single occupant or may provide seating for two or more occupants along the cab wall 28. The lateral position of the seat 40 along the cab wall 28 may be adjusted accordingly to accommodate various numbers of seats 40, other articles, or storage units.

Figure 3:
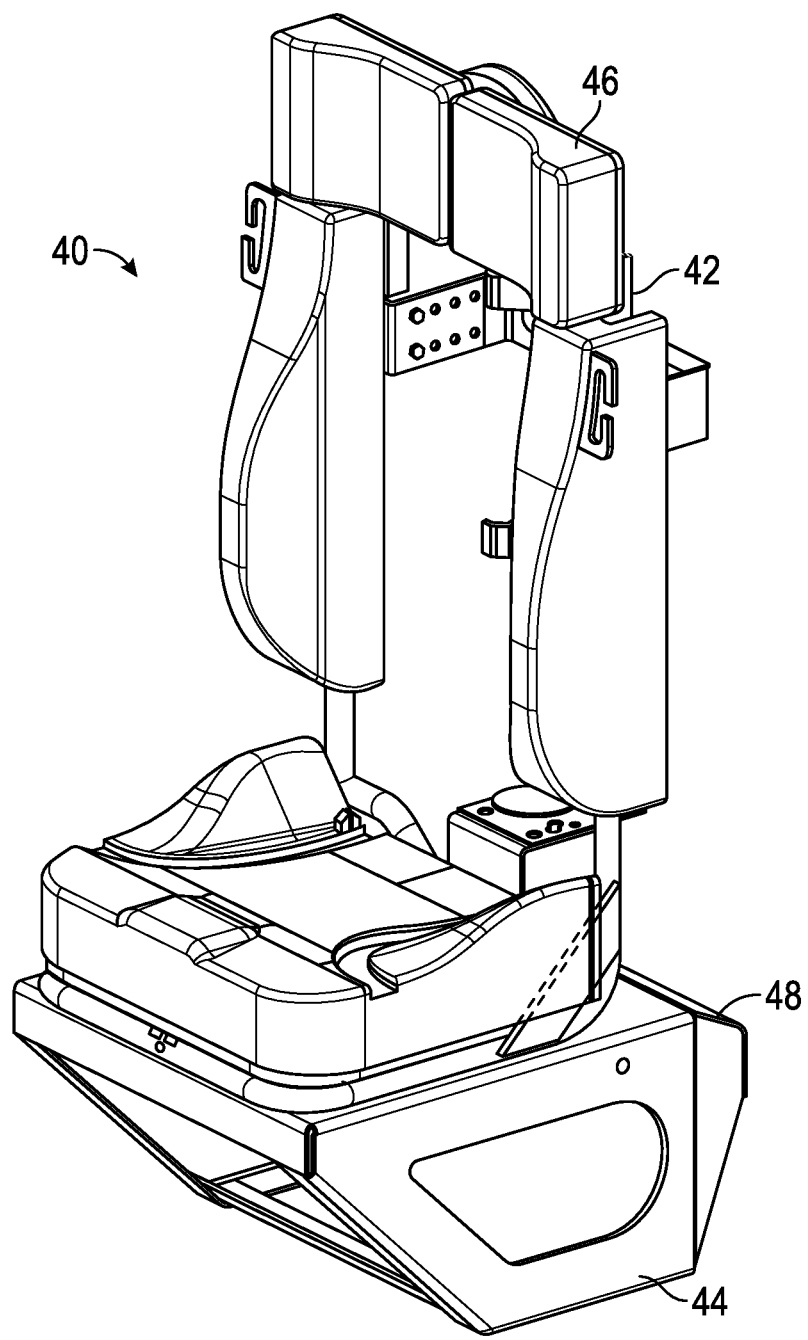
FIG. 3 is front perspective view of a seat and a seat bracket for use with the variable position seat mounting system of FIG. 2.
Figure 4:
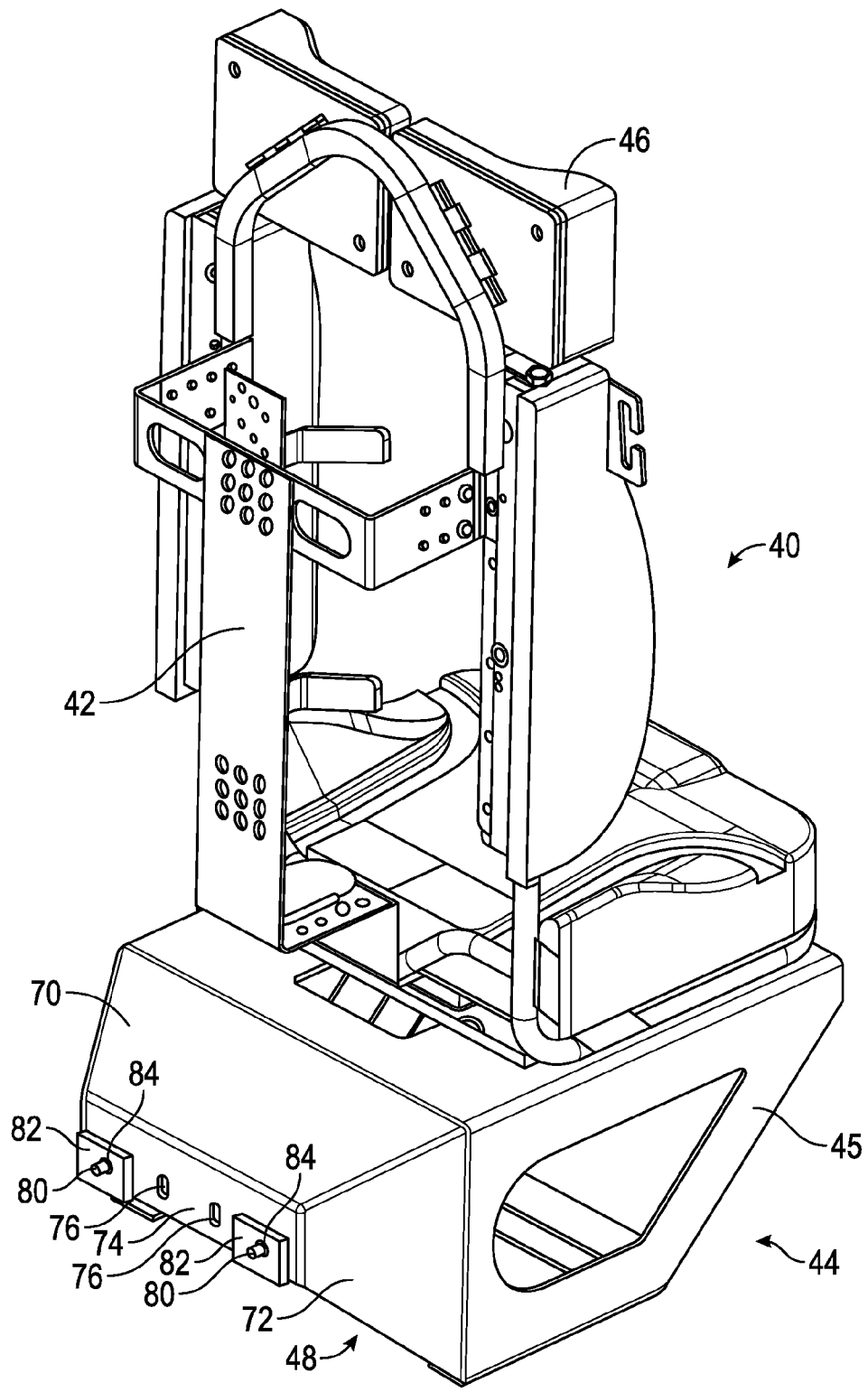
FIG. 4 is a rear perspective view of the seat and seat bracket of FIG. 3.
Figure 5:
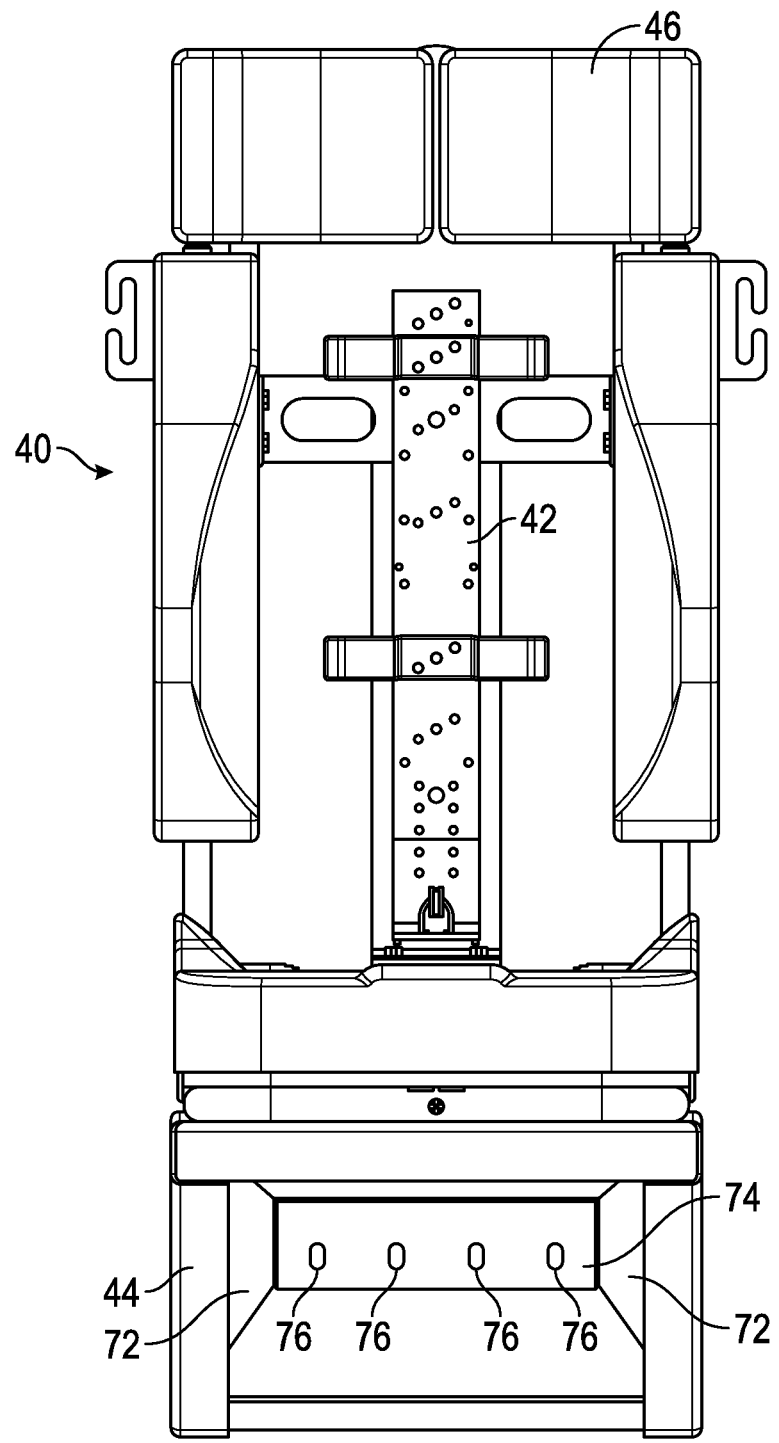
FIG. 5 is a front plan view of the seat and seat bracket of FIG. 3.

The seat 40 is a structure that provides a secure place for an occupant of the fire truck 10 to sit within the front cabin 20 while the fire truck 10 is in transit. Referring to FIGS. 3-5, the seat 40 includes a seat back, shown as seat back frame 42. The seat 40 is supported by a seat bracket, shown as seat bottom frame 44. The seat back frame 42 is configured to support the back of the occupant and extends upward from a seat base, which in turn is configured to provide a surface for an occupant to sit on. According to an exemplary embodiment, seat 40 further includes a headrest 46. The headrest 46 is configured to support the head and neck of the occupant. As shown in FIG. 4, the seat bottom frame 44 includes a mounting structure 48. In one embodiment, the mounting structure 48 is configured to secure seat 40 within the front cabin 20.

According to an exemplary embodiment, the seat back frame 42, the seat bottom frame 44, and the headrest 46 are separate bodies that are coupled together to form a portion of the seat 40. Seat 40 may also include one or more cushions or other structures (e.g., a molded plastic shell) coupled to at least one of the seat back frame 42, the seat bottom frame 44, and the headrest 46 to increase the comfort of the occupant. Various portions of the seat 40 may be adjustable to accommodate occupants of different sizes. For example, a portion of the seat back frame 42 may be moveable relative to the seat bottom frame 44 so that the angular position of the seat back frame 42 may be adjusted (e.g., tilted, etc.) relative to seat bottom frame 44, or the headrest 46 may be moveable relative to the seat back frame 42. According to other exemplary embodiments, the seat back frame 42 and the seat bottom frame 44 may be integrally formed.

Figure 6:
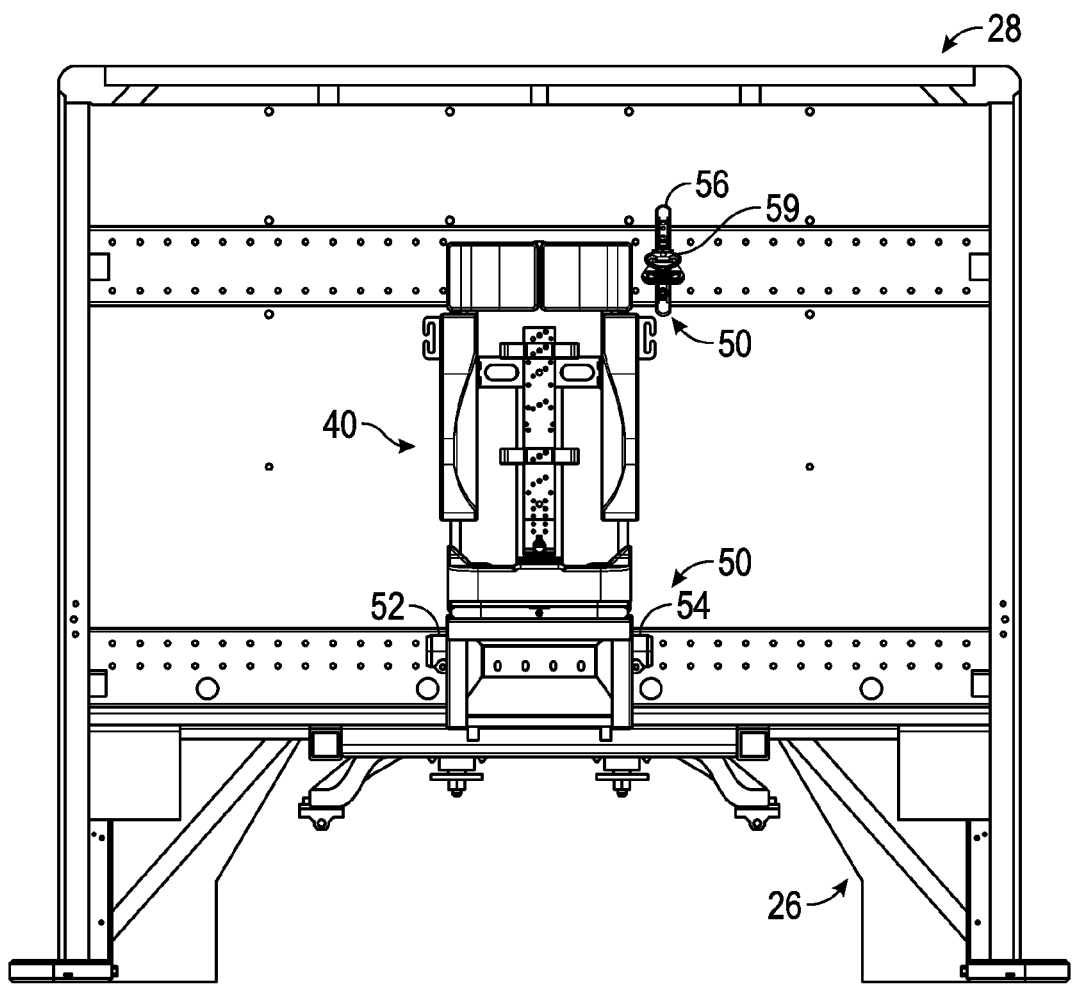
FIG. 6 is a front plan view of the variable position seat mounting system of FIG. 2.
Figure 7:
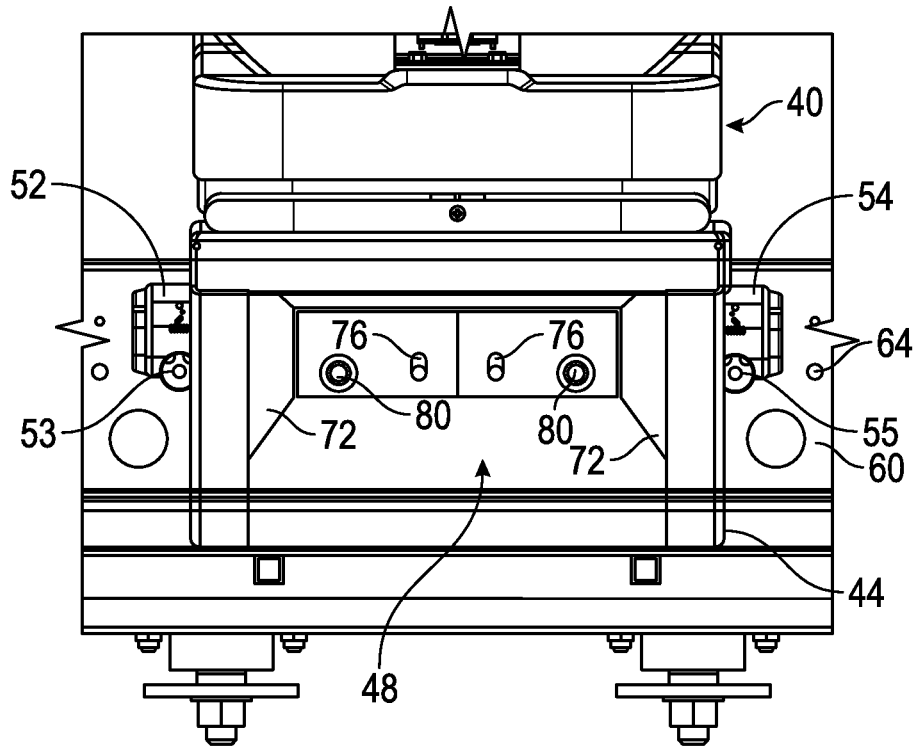
FIG. 7 is a front plan view of the lower portion of the variable position seat mounting system of FIG. 2.
Figure 8:
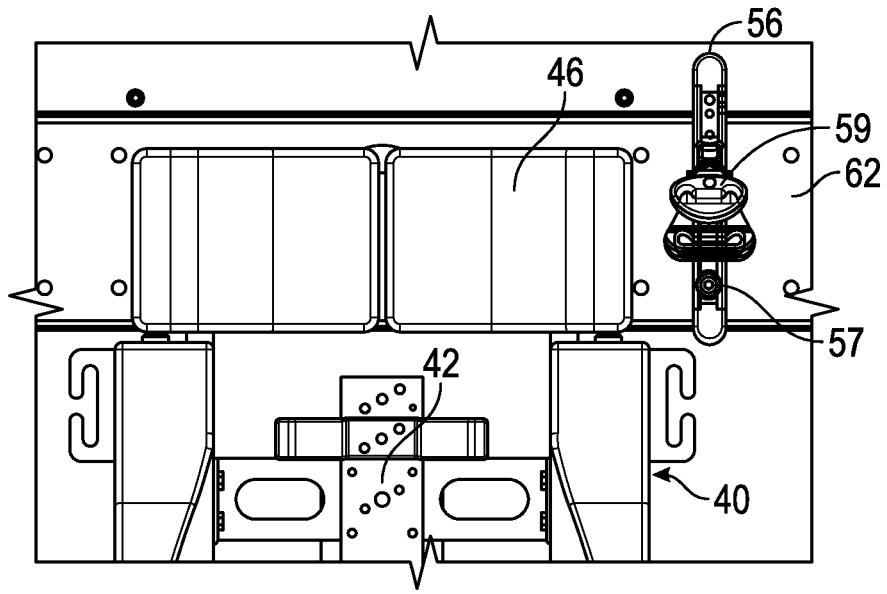
FIG. 8 is a front plan view of the upper portion of the variable position seat mounting system of FIG. 2.

Referring next to the exemplary embodiment shown in FIGS. 6-8, a restraint system, shown as seat belt system 50, is coupled to the cab wall 28. As shown in FIGS. 6-8, seat belt system 50 is a 3-point restraint system, such as a seat belt assembly for use in a passenger vehicle. The seat belt system 50 generally includes a belt (e.g. webbing, strap, etc.), a tongue, and a mating buckle end coupled to a first lower seat belt anchor, shown as a first anchor 52. The belt may be a nylon material, which is threaded through a portion of the tongue. The tongue slides with respect to the belt when in an unbuckled position. Upon attaching the tongue to the mating buckle end, the belt is latched across the vehicle occupant to secure the occupant to the seat 40. An end of the belt engages a refractor that is coupled to a second lower seat belt anchor, shown as a second anchor 54. The retractor is configured to facilitate winding and unwinding the belt. The retractor assembly includes a plurality of springs configured to pretension the belt in a winding direction. In other embodiments, the belt is otherwise secured within front cabin 20 (e.g., the retractor is coupled to floor 26).

According to an exemplary embodiment, the belt is guided through a web guide, shown as a D-ring 59 (e.g., shoulder anchor, automatic turning loop, etc.). As shown in FIGS. 6-8, D-ring 59 is coupled to an upper seat belt anchor, shown as a third anchor 56. The seat belt system 50 may further include a height adjuster that allows for adjustment of the angle at which the belt lies across the occupant's torso. As shown in FIG. 8, the D-ring 59 is movably coupled to the third anchor 56 (e.g., with a sliding track), thereby providing such adjustment.

In other embodiments, the seat belt system 50 is another type of restraint system, such as a 4-point restraint system, a 5-point restraint system, or a 6-point restraint system. For a 4-point restraint system, two lap belts may extend from retractors (e.g., retractors coupled to the first anchor 52 and the second anchor 54) supported at opposite lateral sides of the seat bottom frame 44. The lap belts have free ends that are releasably coupled to each other via a latching device (e.g., clasp, clip, buckle, etc.). Two shoulder belts extend from retractors supported behind or alongside the seat back frame 42 (e.g., retractors coupled to the third anchor 56 and a similar fourth anchor provided opposite the third anchor). The shoulder belts may pass through guides positioned near the headrest 46. The free ends of the shoulder belts are coupled to lap belts on either side of the latching device. In one embodiment, the latching device is sewn or stitched to one of the belts. One or two additional belts may be provided extending between the latching device and an additional anchor on the seat bottom frame 44 for a 5-point restraint system or a 6-point restraint system, respectively. In other embodiments, the seat belt system does not include retractors and instead includes belts having fixed working lengths. The independently moveable anchors 52, 54, and 56 of the seat belt system 50 allow for a variety of restraint systems to be utilized with the seat 40.

Figure 9:
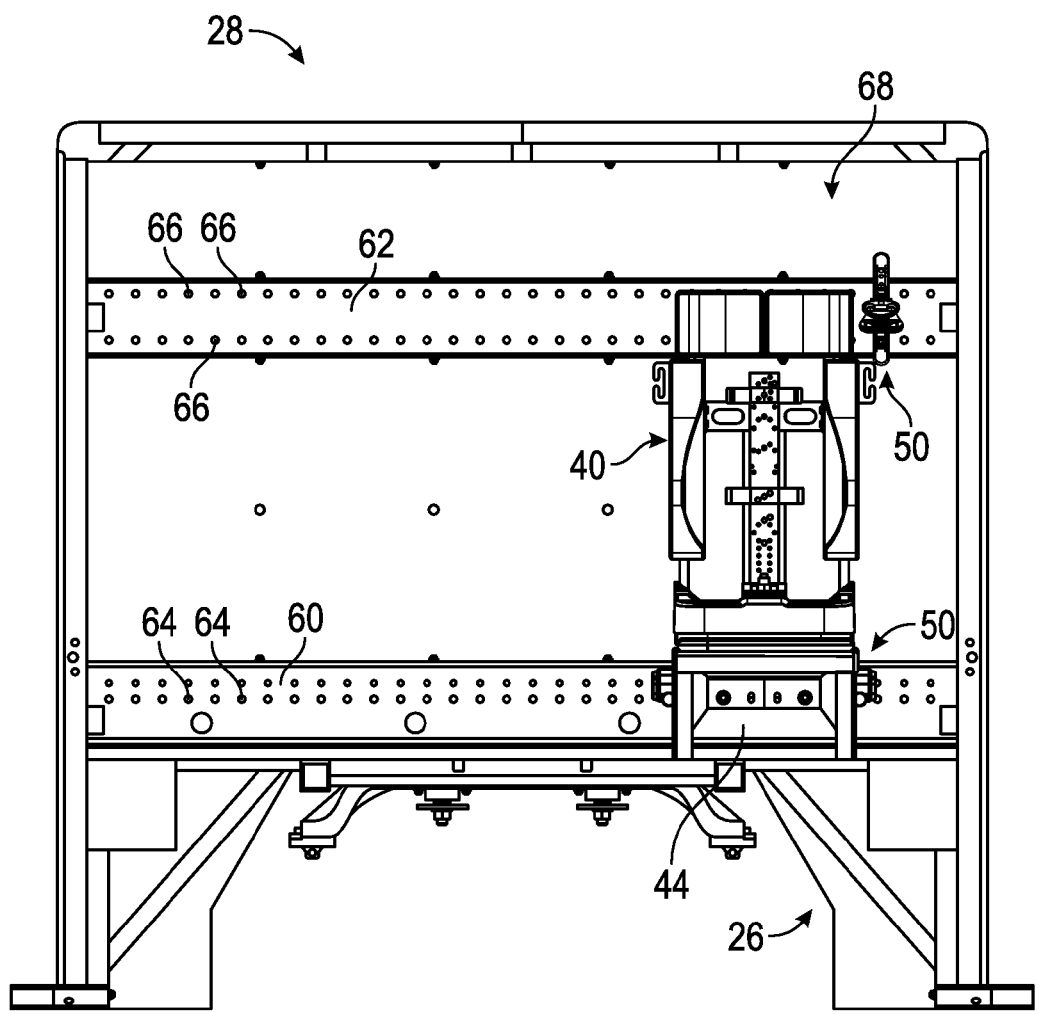
FIG. 9 is a front plan view of a seat and a restraint system coupled to the variable position seat mounting system of FIG. 2 in a first mounting location.
Figure 10:
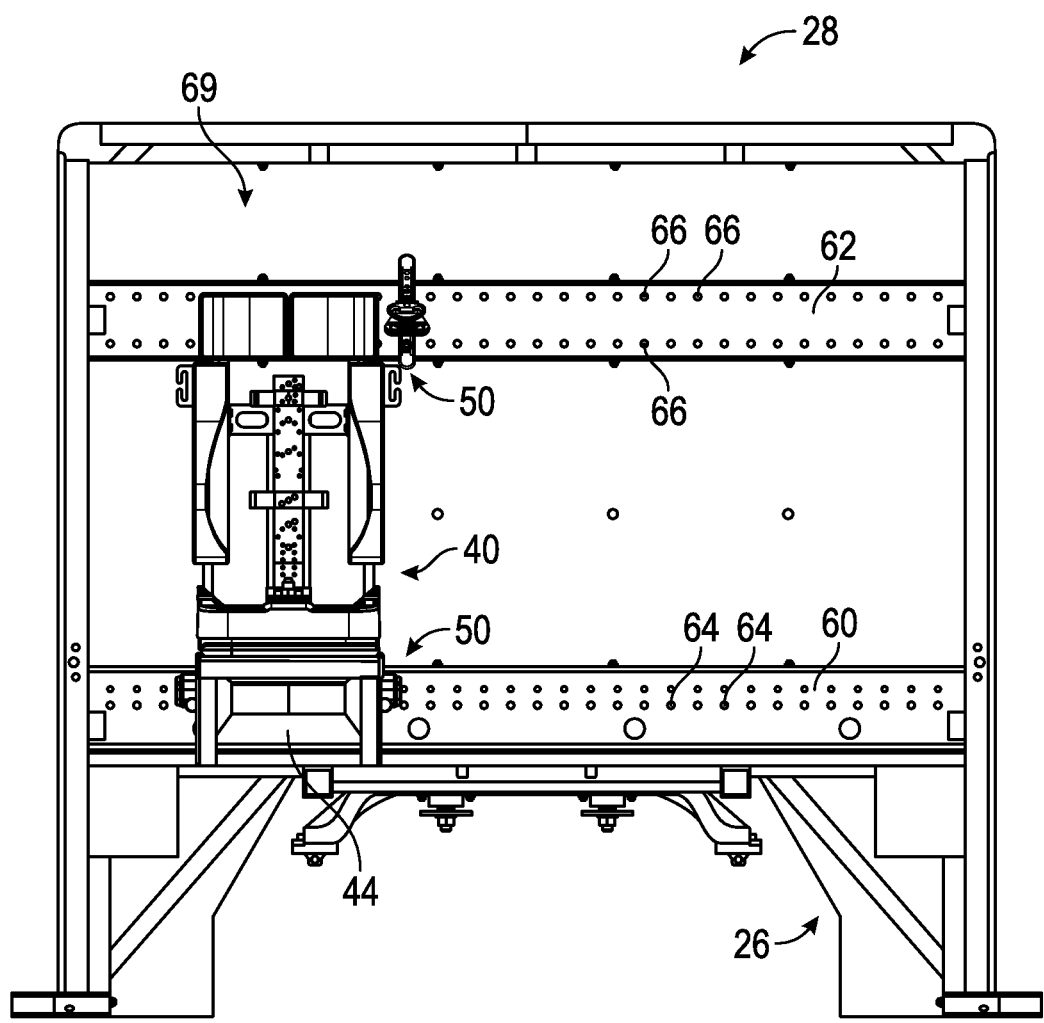
FIG. 10 is a front plan view of a seat and a restraint system coupled to the variable position seat mounting system of FIG. 2 in a second mounting location.

Referring next to FIGS. 7-10, the seat 40 and the seat belt system 50 are coupled to the cab wall 28 with a mounting system that is configured to allow the seat 40 and the seat belt system 50 to be selectively repositioned (e.g., moved, reinstalled, etc.) laterally along the cab wall 28. According to an exemplary embodiment, the mounting system includes a lower rail, shown as a lower track 60, and an upper rail, shown as an upper track 62, that are disposed within the front cabin along the cab wall 28. As shown in FIGS. 9-10, the upper track 62 is substantially parallel to the lower track 60. The upper track 62 may be supported near a ceiling of the front cabin 20, while the lower track 60 may be supported near the floor 26 of the front cabin 20. In one embodiment, the upper track 62 is spaced an offset distance from lower track 60. It should be understood that the mounting system may include any number of tracks or rails extending laterally along the cab wall 28. The seat 40 is mounted to the lower track 60 via the seat bottom frame 44. As shown in FIG. 7, the seat bottom frame 44 is secured to lower track 60 with fasteners, shown as bolts 80. The first anchor 52 and the second anchor 54 are mounted to the lower track 60 with fasteners, shown as bolt 53 and bolt 55, respectively. As shown in FIG. 8, the third anchor 56 is mounted to the upper track 62 with fasteners, shown as bolts 57.

The mounting system includes a series of discrete interface points that define a plurality of mounting locations. In one embodiment, lower track 60 and upper track 62 include the series of discrete interface points that define the plurality of mounting locations. As shown in FIGS. 9-10, apertures, shown as openings 64 and openings 66, are defined by lower track 60 and upper track 62, respectively, at each of the discrete interface points. The openings 64 and the openings 66 provide a plurality of mounting locations for the seat 40 and the seat belt system 50. As shown in FIG. 9, the seat 40 and the seat belt system 50 are positioned in a first mounting location 68. As shown in FIG. 10, the seat 40 and the seat belt system 50 are positioned in a second mounting location 69. The placement and spacing of the openings 64 and the openings 66 may be varied to alter (e.g., increase, decrease, etc.) the number of potential mounting locations for the seat 40 and the seat belt system 50.

According to an exemplary embodiment, seat 40 and seat belt system 50 may be selectively repositioned along lower track 60 and upper track 62 into the first mounting location 68 and the second mounting location 69, among other positions. Such a variable seat mounting system may facilitate the manufacture and use of a vehicle (e.g., fire truck 10, etc.) or a cab assembly (e.g., front cabin 20, etc.). By way of example, seat 40 may be initially installed in the first mounting location 68 (e.g., per a customer's initial design requirements, etc.). A change in the design of the cab assembly or a change in the configuration of the seats may require the manufacturer to move seat 40 laterally across a cab wall into a different position. According to an exemplary embodiment, the manufacturer may selectively reposition seat 40 and seat belt system 50 along the cab wall (e.g., by removing bolts 53, bolts 55, bolts 57 and bolts 80; moving seat 40; and reinserting bolts 53, bolts 55, bolts 57, and bolts 80). Similarly, a user of the vehicle may selectively reposition seat 40 and seat belt system 50 (e.g., to reconfigure the seats, etc.). According to an exemplary embodiment, seat 40 and seat belt system 50 may be selectively repositioned without cutting out existing brackets and welding in new brackets, thereby reducing the time and expense associated with moving traditional seats.

According to an exemplary embodiment, the mounting system of the present disclosure reduces the need to conduct additional testing (e.g., retest the cab assembly, etc.) upon moving seat 40 or seat belt system 50. Various standards apply to the manufacture of a fire apparatus.

By way of example, FMVSS 571.207 applies to seats of a fire apparatus and FMVSS 571.210 applies to seat belts of a fire apparatus. According to an exemplary embodiment, seat belt system 50, lower track 60, and upper track 62 satisfy such standards with seat 40 and seat belt system 50 positioned in the various mounting locations. By way of example, testing may be performed with the seat 40 and seat belt system 50 in each of the identified mounting locations, thereby pre-certifying compliance for various lateral positions. Such testing allows for the subsequent movement of seat 40 and seat belt system 50 without requiring additional testing. In one embodiment the plurality of discrete interface points facilitate compliance with the governing standards (e.g., by improving strength, by predefining potential mounting locations, etc.).

Referring again to FIG. 4, the mounting structure 48 extends in a rearward direction and provides a structure for coupling the seat 40 to the lower track 60. The seat bottom frame 44 forms a cantilever beam suspended above the floor 26 that supports the weight of the seat 40 and an occupant of the seat 40. In one exemplary embodiment, the mounting structure 48 is a pyramidal body formed by a rhomboid top plate 70 and a pair of rhomboid side plates 72 coupled to the top plate 70. The proximal ends of the top plate 70 and the side plates 72 are coupled to an under seat frame 45, and the distal ends of the top plate 70 and the side plates 72 are coupled to an end plate 74. The plates 70, 72, and 74 may be coupled to each other and to the under seat frame 45 with any suitable coupling mechanism, such as through welding or with mechanical fasteners (e.g., bolts, rivets, etc.). One or more of the plates 70, 72, and 74 may be integrally formed with each other or with the under seat frame 45. In an exemplary embodiment, the end plate 74 is flap that is integrally formed with the top plate 70 and folded relative to the top plate 70. In other exemplary embodiments, the mounting structure 48 is another structure constructed to withstand the stresses experienced in a collision such that the seat 40 remains coupled to the lower track 60.

According to the exemplary embodiment shown in FIGS. 4, 5 and 7, apertures, shown as slots 76 are provided in the end plate 74. In one embodiment, the spacing between the slots 76 is the same as the spacing between the openings 64 such that the slots 76 are aligned with a subset of the openings 64 when seat bottom frame 44 is positioned in the various mounting locations along the length of the lower track 60 (e.g., the first mounting location 68, the second mounting location 69, etc.). The seat 40 is coupled to the lower track 60 with the bolts 80 that pass through the aligned slots 76 in the end plate 74 and openings 64 in the lower track 60. According to an exemplary embodiment, each of the bolts 80 engage a threaded opening 84 in a block, shown as a block 82, positioned on the opposite side of the lower track 60. In one embodiment, the slots 76 are oriented vertically. In other exemplary embodiments, at least one of the slots 76 is oriented horizontally. In other exemplary embodiments, one or more of the apertures in the end plate 74 are otherwise shaped (e.g., round, rectangular, etc.). As shown in FIGS. 4, 5, and 7, end plate 74 includes four slots 76, and the seat 40 is mounted to the lower track 60 with two bolts 80. In other exemplary embodiments, slots 76 are otherwise spaced, or the end plate 74 includes more or fewer slots 76. The seat 40 may be coupled to the lower track 60 with any number of bolts 80. According to an exemplary embodiment, the seat 40 further includes a second mounting structure extending from the seat back frame 42 that is configured to be mounted to the upper track 62.

Referring next to the exemplary embodiment shown in FIGS. 11-14, the lower track 60 is an elongated member with a first or front side 96 (e.g., seat side, etc.) and a second or back side 98 (e.g., wall side, etc.). The lower track 60 has a generally C-shaped cross section including a main body 90, an upper flange 92, and a lower flange 94 that extend away from the back side 98. In one embodiment, the openings 64 are a row of evenly spaced holes formed in the main body 90. The openings 64 are spaced apart a distance equal to the distance between the slots 76 in the end plate 74 of the mounting structure 48, according to an exemplary embodiment. The distance between the openings 64 and the number of openings 64 defines the number of, and spacing between, potential mounting locations for the seat 40 and the seat belt system 50. In other embodiments, the openings 64 are otherwise shaped (e.g., horizontally oriented slots, vertically oriented slots, rectangular openings, etc.).

Figure 14:
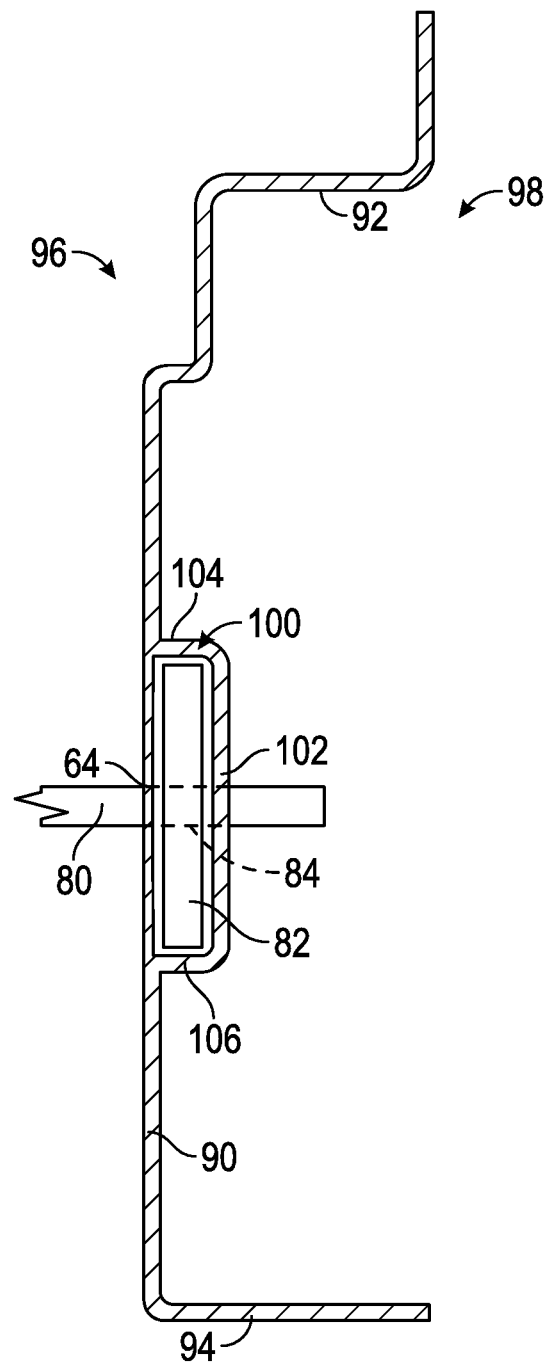
FIG. 14 is a side sectional view of a fastener coupled to a block disposed in the channel of the lower rail of FIG. 11.

As shown in to FIG. 14, the lower track 60 further includes a closed channel 100 defined by a wall 102 spaced apart from the back side 98 of the main body 90. According to an exemplary embodiment, wall 102 is joined to the main body 90 with a top wall 104 and a bottom wall 106. The channel 100 is positioned along the plurality of discrete interface points (e.g., aligned with the row of openings 64, etc.). In one exemplary embodiment, the walls 102, 104, and 106 are integrally formed with the main body 90, such as through a forming process. In other embodiments, the lower track 60 may be otherwise manufactured. For example, the channel may be formed by a length of extruded C-channel that is coupled to the main body with a suitable fastening method (e.g., welding, mechanical fasteners, etc.).

Figure 11:
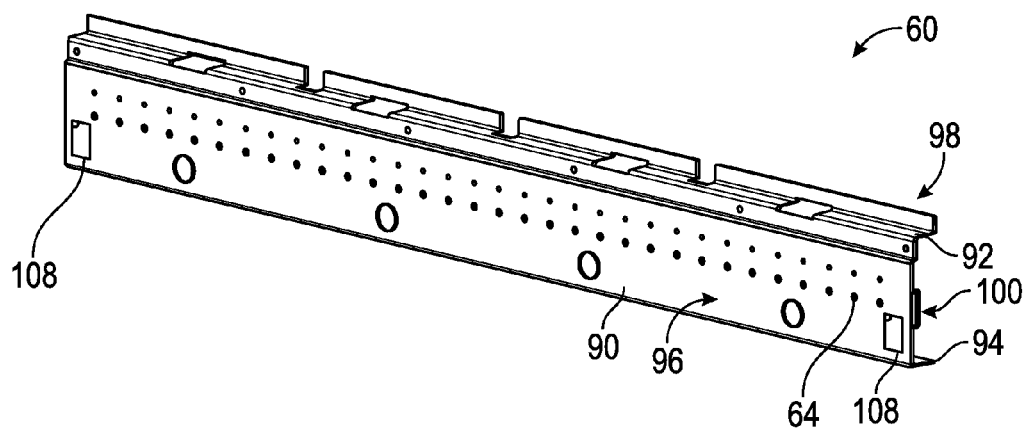
FIG. 11 is a front perspective view of a lower rail for the variable position seat mounting system of FIG. 2.
Figure 12:
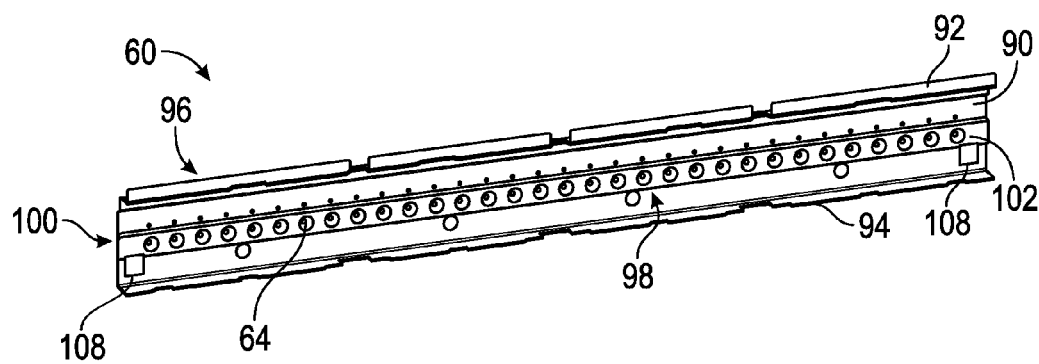
FIG. 12 is a rear perspective view of the lower rail of FIG. 11.
Figure 13:
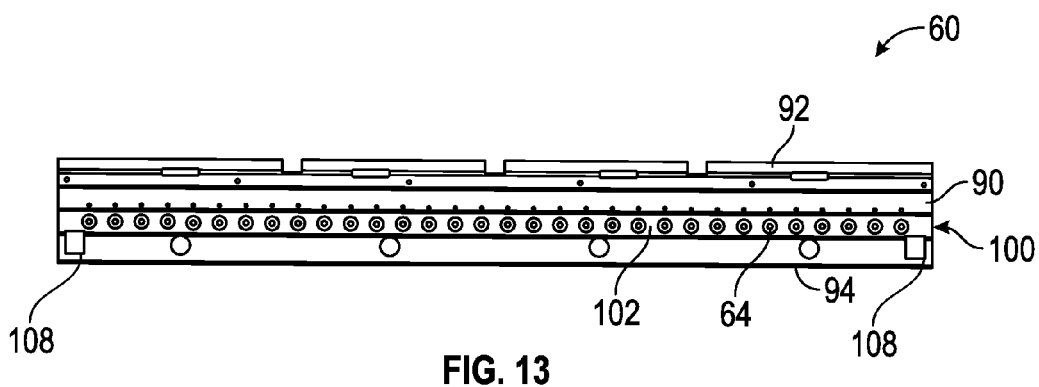
FIG. 13 is a rear plan view of the lower rail of FIG. 11.

The block 82 is slidably received in the channel 100. The block 82 is positioned to align the threaded opening 84 in the block 82 with the openings 64. As shown in FIGS. 11-13, apertures, shown as openings 108, are defined by lower track 60. In one embodiment, openings 108 extend through main body 90 and provide access to channel 100. By way of example, opening 108 may extend through main body 90, a portion of wall 102, and a portion of bottom wall 106. According to an exemplary embodiment, openings 108 are sized to receive block 82 such that block 82 may be inserted or removed from channel 100 through openings 108. Accordingly, block 82 may be selectively inserted or removed from channel 100 even with the sides and back portion thereof enclosed (e.g., by one or more cab walls 28 or other skin panels of a cab assembly, etc.). In one embodiment, block 82 is manufactured from a ferrous material, and main body 90 is manufactured from aluminum or another nonferrous material such that block 82 may be selectively repositioned (e.g., slide, etc.) within channel 100 or removed from channel 100 through openings 108 using a magnet. In other embodiments, the block 82 may be slid into position from the open ends of the channel 100 (e.g., with a rod or other elongated member that may be inserted into the channel 100, with a magnet where block 82 is manufactured from a ferrous material and channel 100 is manufactured from aluminum or another nonferrous material, etc.). In other embodiments, the channel 100 may be open and the lower track 60 may not include the wall 102. The block 82 may be held in the channel by another member (e.g., the cab wall 28, etc.), by inwardly extending ends of the walls 104 and/or 106, or by being coupled (e.g., welded, etc.) to the lower track 60. In other embodiments, other mating fasteners are disposed along back side 98 at main body 90 (e.g., threaded nuts, etc.).

The bolt 80 is inserted into the slot 76 of the seat bottom frame 44 on the front side 96 of the lower track 60 and through one of the openings 64 to engage the threaded opening 84 in the block 82 on the back side 98 of the lower track 60. The bolt 80 may extend beyond the wall 102 through openings 108 in the wall 102. The rotation of the block 82 is limited by the contact of the block 82 with the top wall 104 and the bottom wall 106. In other embodiments, the block 82 may be another body, such as a hex nut, including the threaded opening 84 and insertable into the channel 100. In one embodiment, block 82 and channel 100 facilitate repositioning seat 40 and seat belt system 50 by reducing the need to separately secure a threaded nut on back side 98 of main body 90.

Additional blocks 82 or other similar blocks may be provided in the channel to receive the bolts 53 and 55 and mount the first anchor 52 and the second anchor 54 to the lower track 60. In one embodiment, the blocks are all moveable as described above. In other embodiments, a single block is provided for two or more of the bolts (e.g., the seat 40, the first anchor 52, and the second anchor 54 may all be coupled to the same block disposed in the channel 100). In other embodiments, one or more blocks are permanently coupled to the lower track 60 to provide discrete mounting locations on the lower track 60 for the seat 40 or the seat belt system 50.

Referring next to the exemplary embodiment shown in FIGS. 15-18, the upper track 62 is an elongated member with a front side 116 (e.g., seat side, etc.) and a back side 118 (e.g., wall side, etc.). The upper track 62 has a generally C-shaped cross section including a main body 110, an upper flange 112, and a lower flange 114 that extend away from the back side 118. In one embodiment, the openings 66 are two rows of evenly spaced holes formed in the main body 110. The openings 66 are laterally spaced a distance equal to the distance between the openings 64 in the lower track 60, according to one embodiment. The distance between the openings 66 and the number of openings 66 defines the number of, and spacing between, potential mounting locations for the seat belt system 50. In other embodiments, the openings 66 are otherwise shaped (e.g., horizontally oriented slots, vertically oriented slots, rectangular openings, etc.).

Figure 18:
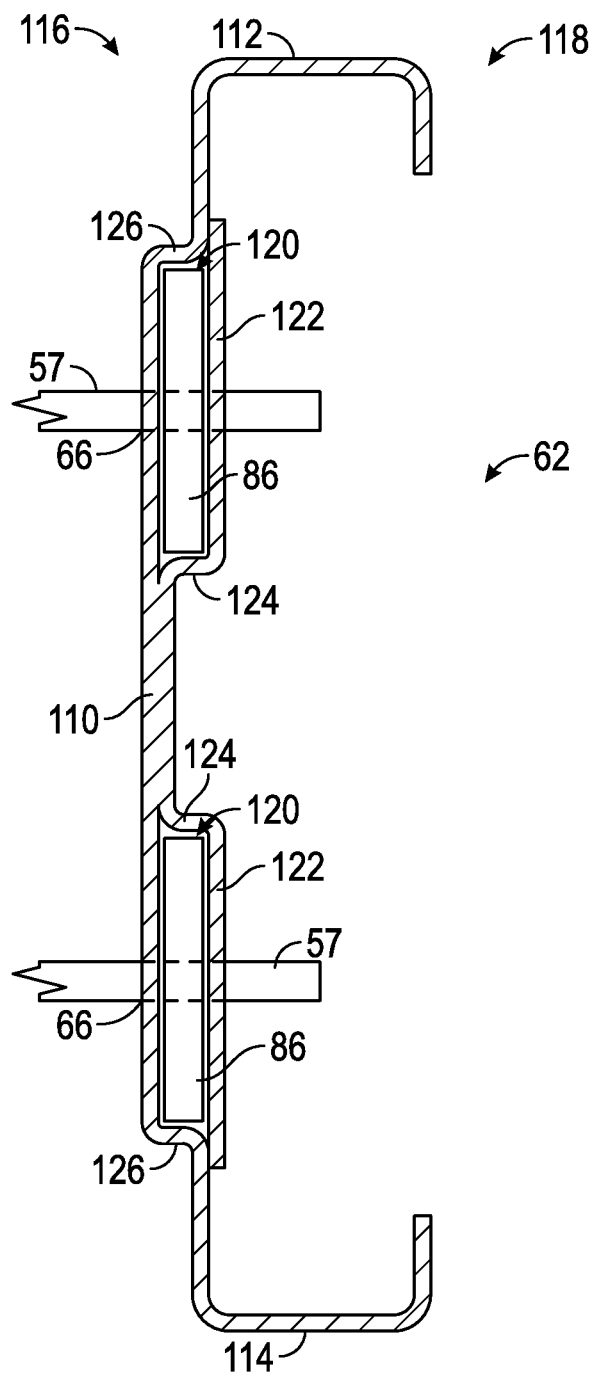
FIG. 18 is a side sectional view of fasteners coupled to blocks disposed in the channels of the lower track of FIG. 15.

As shown in FIG. 18, the upper track 62 further includes closed channels 120 that are each defined by a wall 122 spaced apart from the back side 118 of the main body 110 and joined to the main body 110 with a wall 124. The channels 120 are positioned along the plurality of discrete interface points (e.g., are aligned with the rows of openings 64 in the upper track 62, etc.). The channels 120 may be constructed in a manner similar to the lower track 60, as described above.

Figure 15:
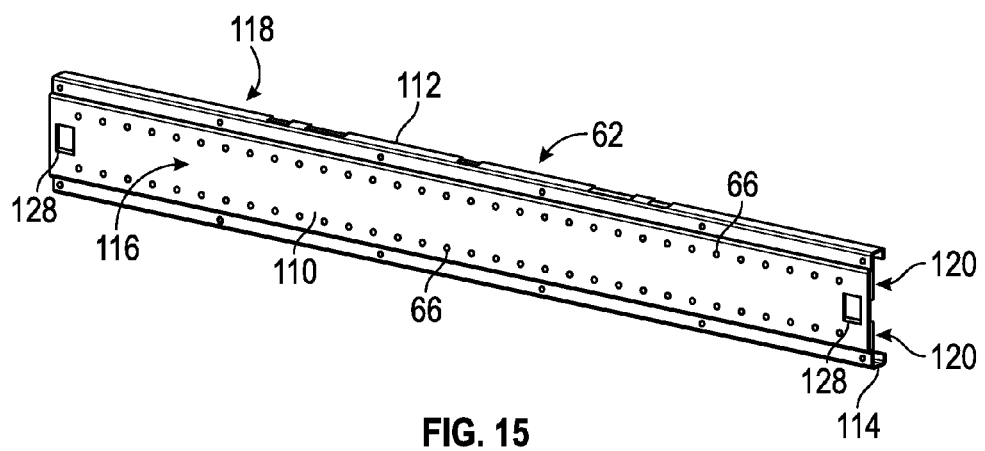
FIG. 15 is a front perspective view of an upper rail for the variable position seat mounting system of FIG. 2.
Figure 16:
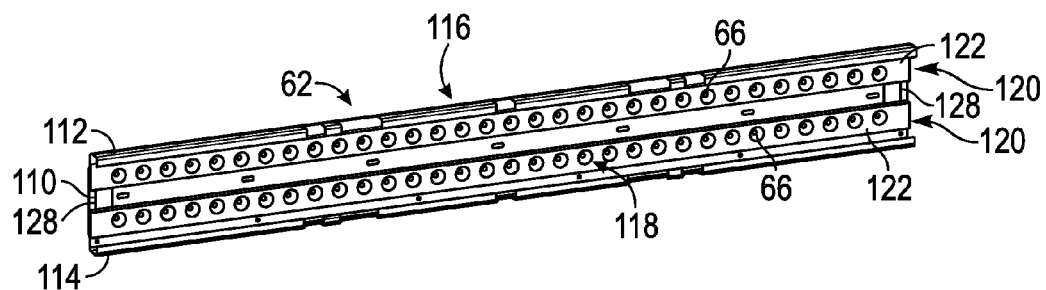
FIG. 16 is a rear perspective view of the upper rail of FIG. 15.
Figure 17:
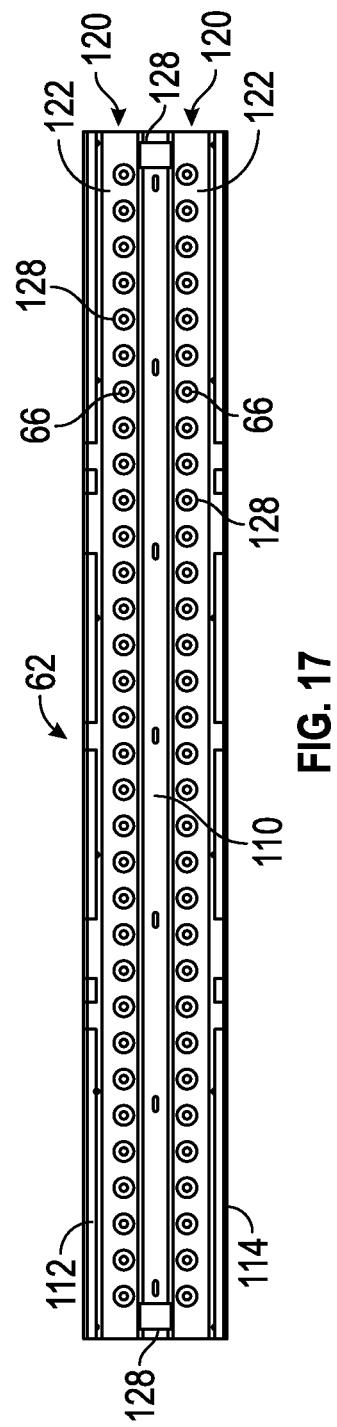
FIG. 17 is a rear plan view of the upper rail of FIG. 15.
Figure 19:
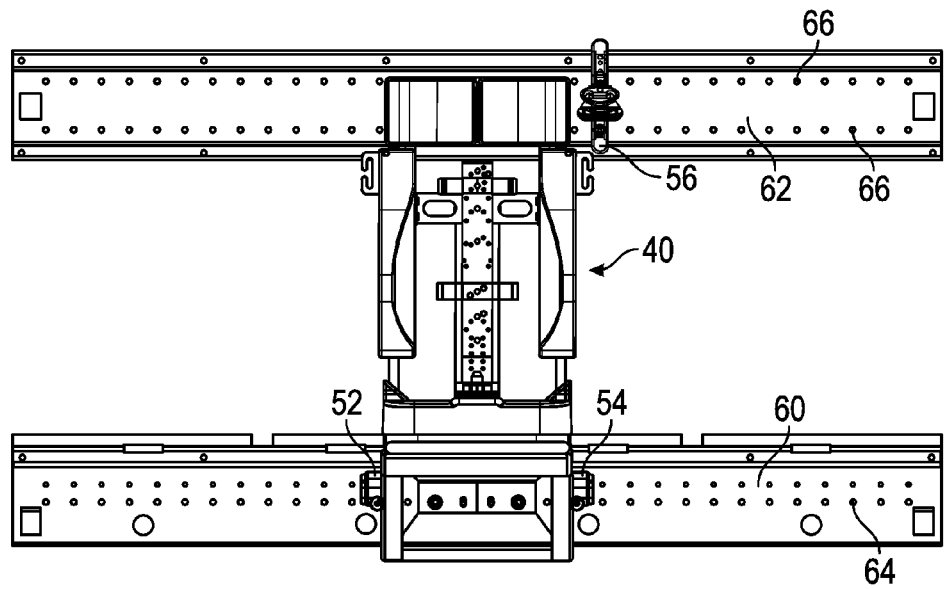
FIG. 19 is a front plan view of a seat and a restraint system coupled to the variable position seat mounting system of FIG. 2.
Figure 20:
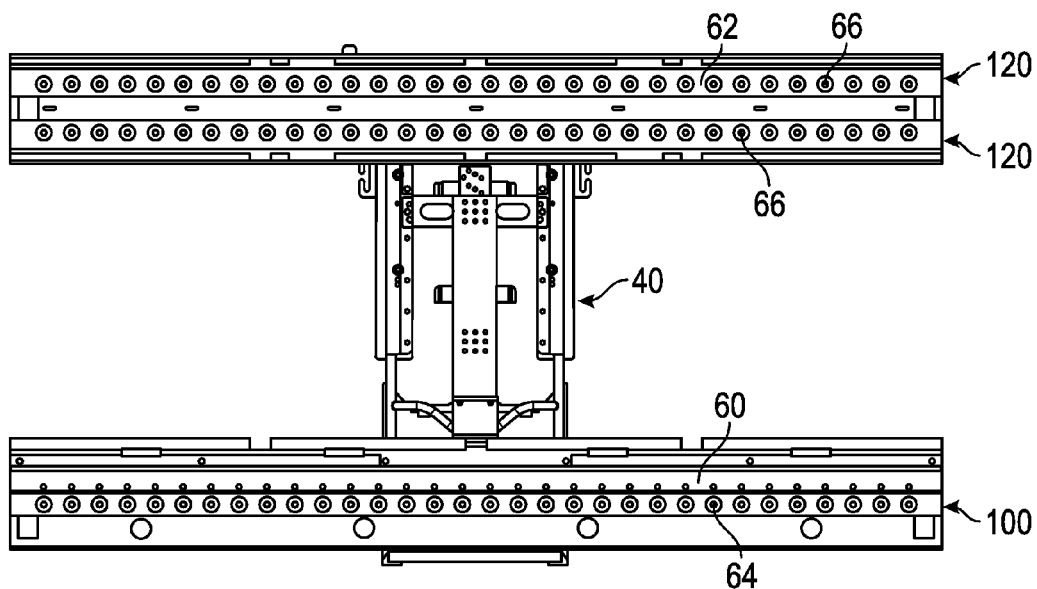
FIG. 20 is a rear plan view of a seat and a restraint system coupled to the variable position seat mounting system of FIG. 2.
Figure 21:
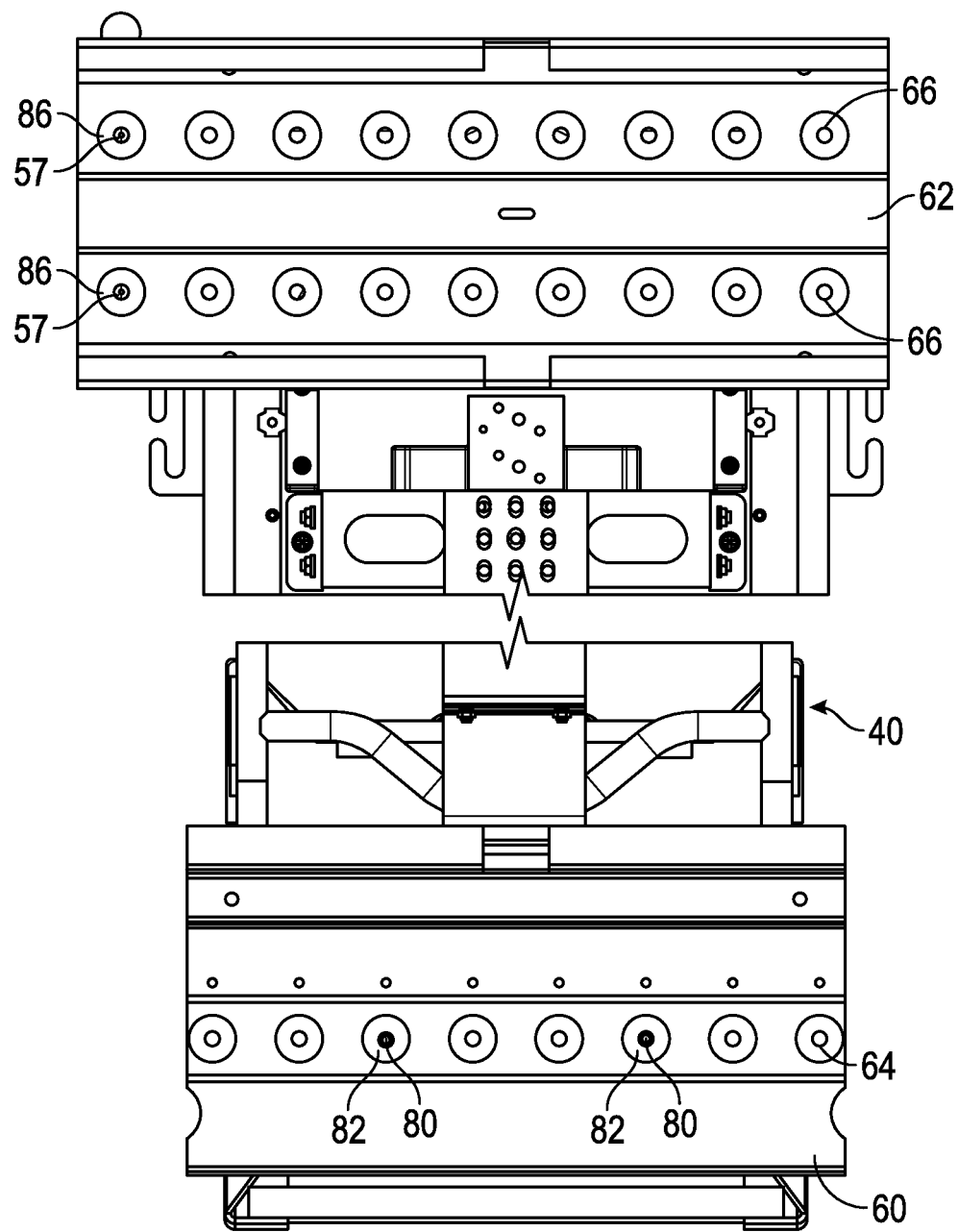
FIG. 21 is a detail rear plan view of a seat and a restraint system coupled to the variable position seat mounting system of FIG. 2.

According to an exemplary embodiment, blocks, shown as blocks 86, are slidably received in the channels 120 similar to the blocks 82 received in the channel 100, as described above. The blocks 86 are positioned to align threaded openings in the blocks 86 with the openings 66. As shown in FIGS. 15-17, apertures, shown as openings 128, are defined by upper track 62. In one embodiment, openings 128 extend through main body 110 and provide access to channels 120. By way of example, openings 128 may extend through main body 110, portions of walls 122, and portions of walls 124. According to an exemplary embodiment, openings 128 are sized to receive blocks 86 such that blocks 86 may be inserted or removed from channels 120 through openings 128. Accordingly, blocks 86 may be selectively inserted or removed from channels 120 even with the sides and back portions thereof enclosed (e.g., by one or more cab walls 28 or other skin panels of a cab assembly, etc.). In one embodiment, blocks 86 are manufactured from a ferrous material, and main body 110 is manufactured from aluminum or another nonferrous material such that blocks 86 may be selectively repositioned (e.g., slide, etc.) within channels 120 or removed from channels 120 through openings 128 using a magnet. In other embodiments, the blocks 86 may be slid into position from the open ends of the channels 120 (e.g., with a rod or other elongated member that may be inserted into the channels 120, with a magnet where blocks 86 are manufactured from a ferrous material and channels 120 are manufactured from aluminum or another nonferrous material, etc.). The bolts 57 are inserted through openings in the third anchor 56 on the front side 116 of the upper track 62 and through one of the openings 64 to engage the threaded openings in the blocks 86 on the back side 118 of the upper track 62. The bolt 80 may extend beyond the wall 122 through openings in the walls 122. The rotation of the blocks 86 is limited by the contact of the blocks 86 with the walls 124 and portions 126 of the main body 110. In other embodiments, the blocks 86 may be other bodies, such as hex nuts, including the threaded openings and insertable into the channels 120. In one embodiment, the blocks 86 may be identical to the blocks 82 such that identical members may be utilized to mount components to the lower track 60 and the upper track 62, reducing the number of parts for the seat mounting system. In other embodiments, one or more bodies may be permanently coupled to the upper track 62 to provide discrete mounting locations on the upper track 62 for the seat belt system 50. As shown in FIGS. 19-21, seat 40 may be secured to the lower track 60 by engaging a set of interface points.

According to an alternative embodiment, the seat 40 and the seat belt system 50 are otherwise coupled to lower track 60 and upper track 62 at the plurality of interface points. By way of example, a plurality of threaded studs may protrude from lower track 60 and upper track 62 at each of the plurality of interface points. Such threaded studs may extend through apertures within components of the seat 40 and the seat belt system 50. A plurality of fasteners (e.g., threaded nuts, etc.) may be used to secure the seat 40 and the seat belt system 50 to the lower track 60 and the upper track 62. In other embodiments, the lower rail 60 and the upper rail 62 define slots at each of the interface points, and the seat 40 and the seat belt system 50 include locking tabs (e.g., L-shaped tabs, etc.) that protrude into the slots to secure the position of the seat 40 and the seat belt system 50.

According to another alternative embodiment, the seat 40 and the seat belt system 50 are slidably coupled to the lower track 60 and the upper track 62. By way of example, the seat 40 and the seat belt system 50 may slide along a rail coupled to at least one of the lower track 60 and the upper track 62. The rail(s) may include a variety of discrete locking locations (e.g., holes in the rail, notches, etc.) to which the seat 40 and the seat belt system 50 engage (e.g., via fasteners, pins, bolts, etc.) to be secured. This embodiment prevents the need to un-mount the seat 40 and seat belt system 50 when moving from a first mounting location to a second mounting location.

Figure 22:
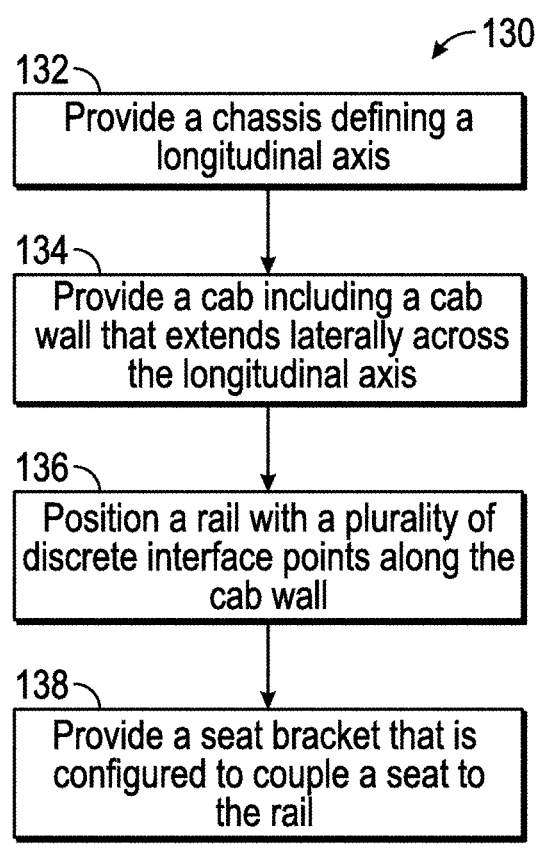
FIG. 22 is a flowchart of a method for manufacturing a vehicle, according to an exemplary embodiment.

Referring to FIG. 22, a method 130 of manufacturing a vehicle is shown, according to an exemplary embodiment. A chassis is provided defining a longitudinal axis (step 132). A cab is provided including a cab wall that extends laterally across the longitudinal axis (step 134). A rail is positioned along the cab wall (step 136). The rail includes a plurality of discrete interface points that define a first mounting location and a second mounting location. A seat bracket is provided that is configured to couple a seat to the rail (step 138). The seat bracket and the seat are selectively repositionable along the rail into the first mounting location or the second mounting location. Method 130 may include more or fewer steps, according to various alternative embodiments.

The structure of the lower track 60, the upper track 62, the seat 40, and the seat belt system 50 are configured such that the integrity of the seat mounting system is maintained in a collision regardless of the positions of the seat 40 and the seat belt system 50. Each of the mounting locations provided by the openings 64 in the lower track 60 and the openings 66 in the upper track 62 may be tested during manufacturing of the fire truck 10. In this way, the positions of seats 40 and seat belt systems 50 may be varied by the end user of the fire truck 10 without additional testing.

Figure 23:
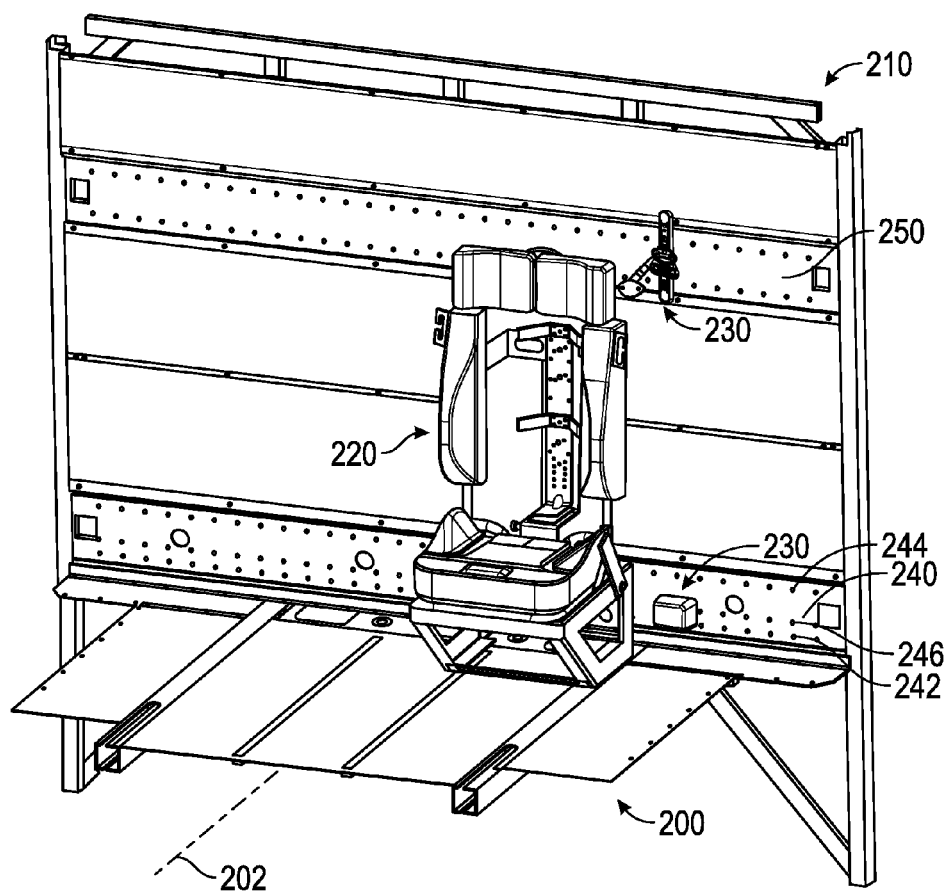
FIG. 23 is a front perspective view of a variable position seat mounting system, according to an exemplary embodiment.
Figure 24:
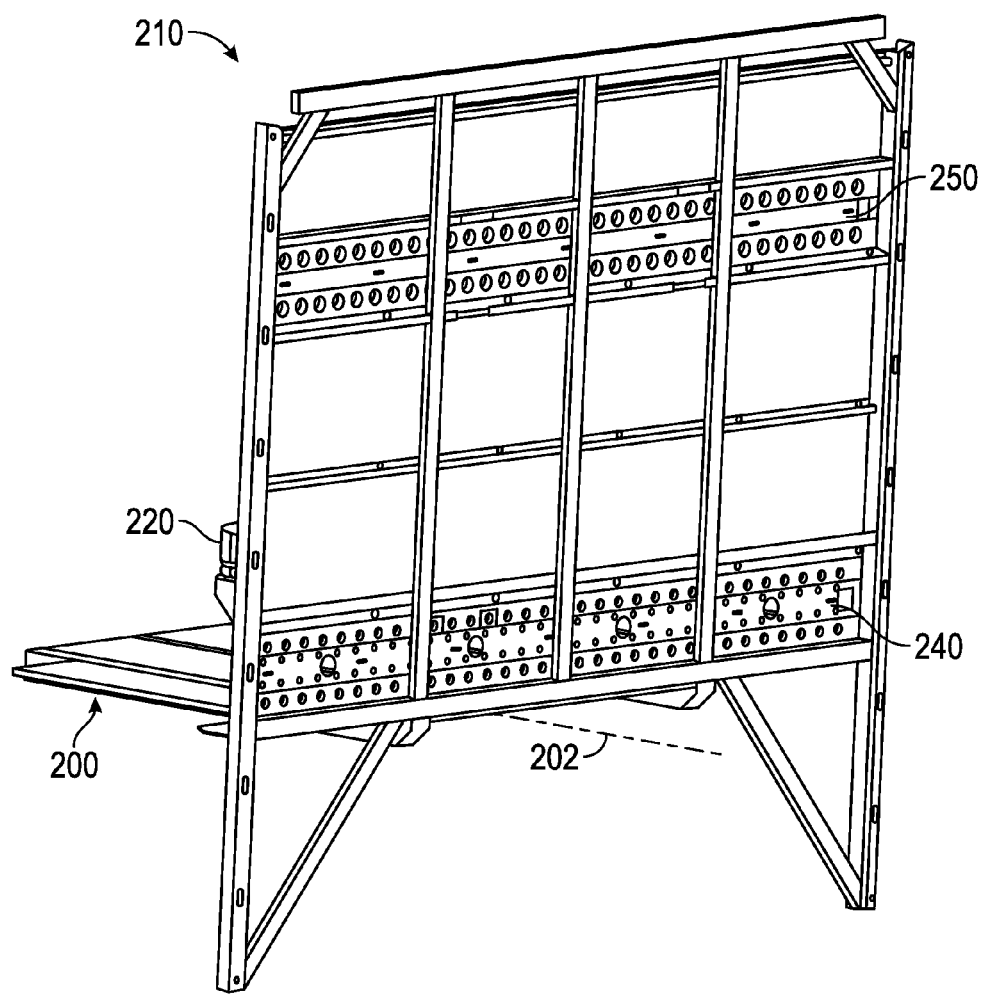
FIG. 24 is a rear perspective view of the variable position seat mounting system of FIG. 23.
Figure 25:
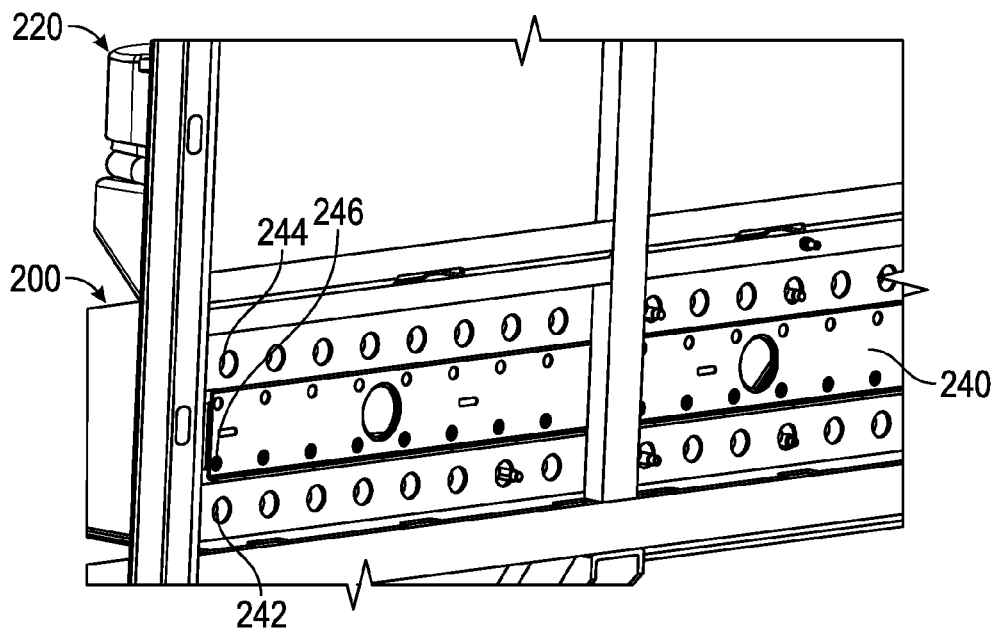
FIG. 25 is a detail rear perspective view of the variable position seat mounting system of FIG. 23.
Figure 26:
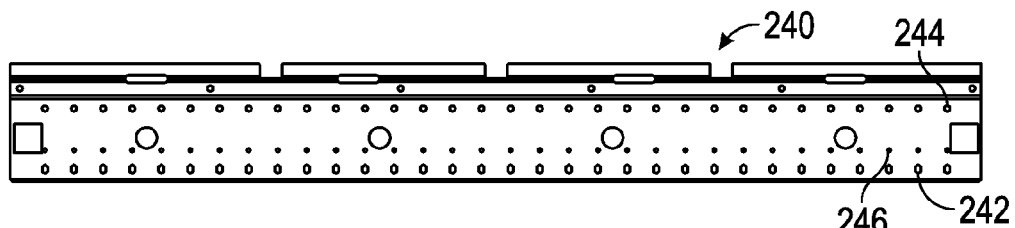
FIG. 26 is a front plan view of a lower rail for the variable position seat mounting system of FIG. 23.
Figure 27:
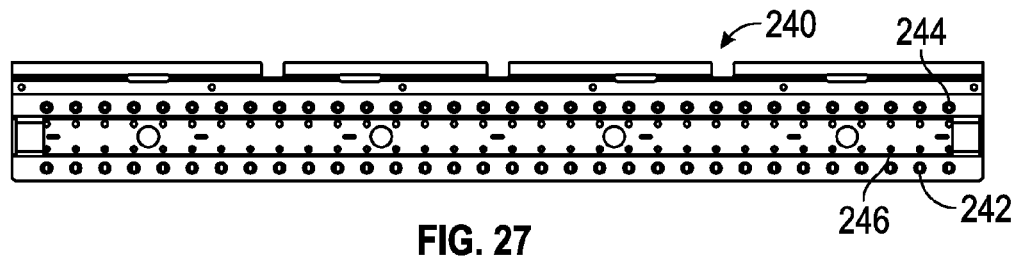
FIG. 27 is a rear plan view of a lower rail for the variable position seat mounting system of FIG. 23.
Figure 28:
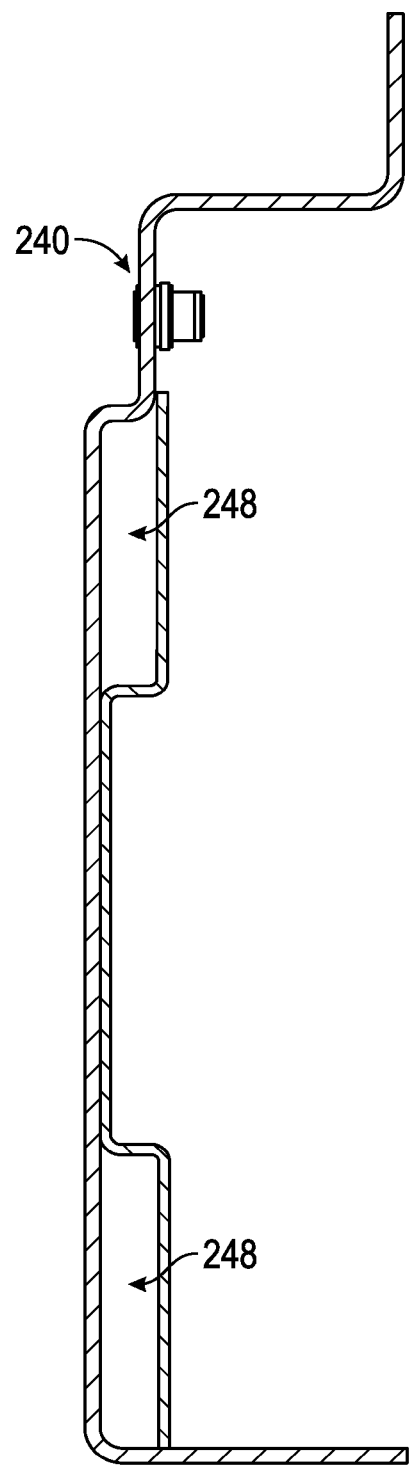
FIG. 28 is a side sectional view of a lower rail for the variable position seat mounting system of FIG. 23.

Referring next to the alternative embodiment shown in FIGS. 23-24, a structural frame assembly for a cabin includes, among other components, a floor 200 and a cab wall, shown as cab wall 210, extending in a generally vertical direction. The cab wall 210 is a structural member providing a body to which seating and other components may be mounted. As shown in FIG. 23, the cab wall 210 is orthogonal to a longitudinal axis 202. In one embodiment, the longitudinal axis 202 is generally aligned with a frame rail of a fire truck (e.g., front to back, etc.). As shown in FIG. 23, a seat, shown as seat 220, and a restraint system, shown as seat belt system 230, are coupled to cab wall 210. According to the embodiment shown in FIGS. 23-25, a lower rail, shown as lower track 240, and an upper rail, shown as upper track 250, are coupled to cab wall 210. In one embodiment, lower track 240 and upper track 250 include the series of discrete interface points that define the plurality of mounting locations. As shown in FIG. 23, apertures are defined by lower track 240 and upper track 250 at each of the discrete interface points. As shown in FIGS. 23 and 26-27, lower track 240 defines a first series of apertures 242, a second series of apertures 244, and a third series of apertures 246. As shown in FIGS. 23 and 26-27, first series of apertures 242 are spatially offset (e.g., spaced, etc.) from second series of apertures 244. As shown in FIG. 28, lower track 240 includes sidewalls that define a pair of channels 248 positioned along the plurality of interface points. Blocks may be positioned within channels 248. In one embodiment, the blocks include threaded apertures that receive fasteners to secure seat 220 to lower track 240. According to an exemplary embodiment, seat 220 is coupled to lower track 240 with fasteners that extend through a set of apertures 242 and apertures 244 (e.g., the fasteners may extend through corresponding apertures within a portion of seat 220, etc.). Coupling seat 220 to lower track 240 at two heights (e.g., at first series of apertures 242 and second series of apertures 244, etc.) may reduce the deflection of seat 220 due to the weight of a passenger. In other embodiments, seat 220 is otherwise coupled to lower track 240 at a set of interface points. As shown in FIG. 23, a portion of seat belt system 230 (e.g., a retractor, etc.) is coupled to lower track 240 with fasteners that extend through third series of apertures 246. In one embodiment, other portions of seat belt system 230 are coupled to upper track 250.

The construction and arrangements of the vehicle and seat mounting system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A vehicle, comprising:
   a chassis having a longitudinal axis;
   a cab coupled to the chassis and including a cab wall extending laterally across the longitudinal axis;
   a rail disposed along the cab wall, the rail including a plurality of apertures that define a first mounting location and a second mounting location;
   a seat bracket coupling a seat to the rail, the seat bracket defining an aperture positioned to align with at least one of the plurality of apertures of the rail when the seat bracket is in the first mounting location or the second mounting location, wherein the seat bracket and the seat are selectively repositionable along the rail into the first mounting location or the second mounting location; and
   a fastener coupling the seat bracket to the rail, wherein the fastener extends from a first side of the rail to a second side of the rail.

2. The vehicle of claim 1, the rail further comprising a channel, wherein the channel is positioned on the second side of the rail along the plurality of apertures.

3. The vehicle of claim 2, further comprising a block movably positioned within the channel, wherein the block defines an aperture configured to receive the fastener and secure the seat bracket to the rail.

4. A vehicle, comprising:
   a chassis having a longitudinal axis;
   a cab coupled to the chassis and including a cab wall extending laterally across the longitudinal axis;
   a lower rail and an upper rail disposed along the cab wall, the lower rail and the upper rail each including a plurality of apertures defining a plurality of mounting locations;
   a seat bracket coupling a seat to the lower rail in one of the plurality of mounting locations, the seat bracket defining an aperture positioned to align with at least one of the plurality of apertures of the lower rail;
   a fastener coupling the seat bracket to the lower rail, wherein the fastener extends from a first side of the lower rail to a second side of the lower rail; and
   a restraint system including a lower seatbelt anchor coupled to the lower rail in one of the plurality of mounting locations and an upper seatbelt anchor coupled to the upper rail in one of the plurality of mounting locations, wherein the restraint system is selectively repositionable along the upper rail and the lower rail into any of the plurality of mounting locations such that the seat position may be varied across the cab wall.

5. The vehicle of claim 4, the lower rail further comprising a channel, wherein the channel is positioned on the second side of the lower rail along the plurality of apertures.

6. The vehicle of claim 5, further comprising a block movably positioned within the channel, wherein the block defines an aperture configured to receive the fastener and secure the seat bracket to the lower rail.

7. The vehicle of claim 4, further comprising a second lower seatbelt anchor coupled to the lower rail in one of the plurality of mounting locations.

8. The vehicle of claim 7, wherein the first lower seatbelt anchor includes a retractor, wherein the second lower seatbelt anchor includes a buckle end, and wherein the upper seatbelt anchor includes a web guide.

9. The vehicle of claim 4, wherein the upper rail is parallel to the lower rail.

10. The vehicle of claim 9, wherein the upper rail is spaced an offset distance from the lower rail.

11. The vehicle of claim 10, wherein the cab wall is a rear wall of the cab.

* * * * *